(12) United States Patent
Hormann et al.

(10) Patent No.: US 9,798,275 B2
(45) Date of Patent: Oct. 24, 2017

(54) SYSTEM AND METHOD FOR APPLYING LUBRICANT ONTO A SURFACE

(71) Applicant: Clover Technologies Group, LLC, Ottawa, IL (US)

(72) Inventors: Heymo Hormann, Wilmington, IL (US); Craig Calsyn, Peru, IL (US); Daniel J. Andersen, Oak Forest, IL (US)

(73) Assignee: Clover Technologies Group, LLC, Ottawa, IL (US)

( * ) Notice: Subject to any disclaimer, the term of this patent is extended or adjusted under 35 U.S.C. 154(b) by 267 days.

(21) Appl. No.: 14/731,550

(22) Filed: Jun. 5, 2015

(65) Prior Publication Data

US 2015/0355582 A1    Dec. 10, 2015

Related U.S. Application Data (60) Provisional application No. 62/008,151, filed on Jun. 5, 2014.

(51) Int. Cl.
| | |
|---|---|
| *G03G 15/00* | (2006.01) |
| *G03G 15/20* | (2006.01) |
| *F16N 7/14* | (2006.01) |
| *F16N 39/04* | (2006.01) |
| *F16N 21/04* | (2006.01) |

(52) U.S. Cl.
CPC .......... *G03G 15/2025* (2013.01); *F16N 7/14* (2013.01); *F16N 21/04* (2013.01); *F16N 39/04* (2013.01)

(58) Field of Classification Search
CPC ....... G03G 15/2025; F16N 7/14; F16N 21/04; F16N 39/04
See application file for complete search history.

(56) References Cited

U.S. PATENT DOCUMENTS

| | | | | |
|---|---|---|---|---|
| 4,085,702 | A * | 4/1978 | Consaul | G03G 15/2025 118/259 |
| 5,708,914 | A * | 1/1998 | Mills | B41J 2/01 399/325 |
| 6,263,182 | B1 * | 7/2001 | Baker | G03G 15/2025 399/325 |
| 6,557,651 | B1 * | 5/2003 | Norby | F16L 15/003 175/52 |
| 7,414,015 | B2 * | 8/2008 | Skerlos | B23Q 11/1053 184/6.26 |
| 7,975,805 | B2 * | 7/2011 | Wech | F16N 7/32 184/104.1 |
| 2004/0120736 | A1 * | 6/2004 | Kowalski | G03G 15/2025 399/325 |
| 2012/0247876 | A1 * | 10/2012 | Kreutzkamper | F16N 7/385 184/26 |

* cited by examiner

*Primary Examiner* — Michael Riegelman
(74) *Attorney, Agent, or Firm* — Mathew G. Gavronski (57) ABSTRACT

A system and method for applying lubricant to a surface, such as a heating surface of a fuser member. The system includes lubricant conduit for carrying pressurized lubricant toward a spraying assembly. A heating element surrounds the lubricant conduit and heats the pressurized lubricant before it arrives at the spraying assembly. The system also includes a pair of double O-ring sealing assemblies for sealingly coupling a lubricant tube to the system.

7 Claims, 8 Drawing Sheets

SYSTEM AND METHOD FOR APPLYING LUBRICANT ONTO A SURFACE

CROSS REFERENCE TO RELATED APPLICATION

This application claims the benefit of and priority to U.S. Provisional Patent Application No. 62/008,151, filed Jun. 5, 2014, the entire contents of which are hereby incorporated by reference herein.

BACKGROUND

The present disclosure relates to automated manufacturing and, more particularly, to the application of a uniform amount of lubricant, such as high temperature lubricant, to a surface, such as a fuser for an image forming apparatus.

Remanufacturing of technology assets is a growing industry that seeks to reduce the consumption of raw material and provide a lower cost alternative to newly-built products. One area of technology where remanufacturing has taken hold is in the printer consumables industry, where used toner cartridges, ink cartridges, printer ribbon cartridges, and the like are collected, sorted, cleaned, disassembled, and reconstructed using a combination of previously used parts and new replacement parts, and refilled with toner, ink, or printer ribbon, as the case may be.

In addition to the remanufacturing of cartridges, certain components within a printer, such as the fuser of a laser printer, may become spent over time but, instead of being replaced, it may be possible to remanufacture the fuser and make it suitable for continued use by disassembling, cleaning, and replacing certain components. As part of the remanufacturing process, the fuser heating element typically is cleaned. To return the heating element to service, a specially formulated high temperature lubricant is applied to the surface of the heating element. Traditional remanufacturing techniques have applied the lubricant by extruding it through an orifice and applying a bead of lubricant to the heating element surface. The bead is then spread over the surface of the heating element using a flexible blade, such as a spatula, or using a finger to coat the entire surface with a film of lubricant.

SUMMARY

In some aspects, a system for applying a lubricant to a surface is provided and includes a lubricant conduit including an input end for receiving lubricant, an output end, and a heating element between the input end and the output end, and an applicator fluidly coupled to the output end to receive heated lubricant therefrom and operating to apply the heated lubricant to the surface.

The system may also include a receiver chamber for receiving a supply of the lubricant. The receiver chamber may include an insertion end configured to receive the supply of lubricant and an output end opposite the insertion end. A pusher member may be positionable within the supply of the lubricant for applying pressure to the lubricant. The pusher member may include a pressure face facing away from the lubricant and toward the insertion end when the supply of lubricant is received by the receiver chamber. The pusher member may include a through opening and a pressure release member associated with the through opening and moveable between a sealed position and an unsealed position for venting the through opening. The input end may include a coupling member having a generally cylindrical sealing portion. The sealing portion may include a first sealing member having an axially facing sealing portion and a second sealing member having a radially outwardly facing sealing portion. The coupling member may define an axially opening circumferential groove that receives the first sealing member and a radially outwardly opening circumferential groove that receives the second sealing member. The system may also include a receiver chamber for receiving a supply of the lubricant. The supply of the lubricant may include a discharge end, and the first sealing member may sealingly engage an annular end surface of the discharge end and the second sealing member may engage an inner cylindrical surface of the discharge end when the supply of the lubricant is installed in the receiver chamber. The heating element may substantially surround the lubricant conduit.

In other aspects, a fuser lubricant applicator is provided and includes a base fixture including uprights and clamp members for supporting a plurality of fuser members in a spaced and substantially parallel relationship, and a spraying assembly moveably supported above the base fixture for movement in a direction substantially parallel to the orientation of the plurality of fuser members. The spraying assembly includes a plurality of lubrication assemblies, and each lubrication assembly includes a receiving chamber for receiving lubricant, a nozzle positioned to apply lubricant to a respective one of the fuser members, and a heating element positioned between the receiving chamber and the nozzle.

The lubrication assembly may also include a lubricant conduit having an input end proximal to the receiving chamber and an output end in communication with the nozzle, and the heating element may substantially surround the lubricant conduit. The receiving chamber may include an insertion end configured to receive a supply of the lubricant and an output end opposite the insertion end. The system may also include a pusher member positionable within the supply of the lubricant for applying pressure to the lubricant. The pusher member may include a pressure face facing away from the lubricant and toward the insertion end when the supply of lubricant is received by the receiving chamber. The pusher member may include a through opening and a pressure release member associated with the through opening. The pressure release member may be moveable between a sealed position and an unsealed position for venting the through opening. The lubrication assembly may also include a lubricant conduit having an input end proximal to the receiving chamber and an output end in communication with the nozzle. The input end may include a coupling member having a generally cylindrical sealing portion and the sealing portion may include a first sealing member having an axially facing sealing portion and a second sealing member having a radially outwardly facing sealing portion. The coupling member may define an axially opening circumferential groove that receives the first sealing member and a radially outwardly opening circumferential groove that receives the second sealing member.

In still other aspects, a method of applying lubricant to a surface is provided and includes pressurizing lubricant in a supply container, conveying the pressurized lubricant toward a spray assembly by way of a lubricant conduit, heating the pressurized lubricant in the lubricant conduit, and spraying the heated, pressurized lubricant onto the surface.

Pressurizing the lubricant in the supply container may include applying pressure to a pressure face of a pusher member including a through opening and a pressure release member associated with the through opening. The pressure release member may be moveable between a sealed position for applying pressure to the lubricant and an unsealed position for venting the through opening and positioning the pusher member against the lubricant. Conveying the pressurized lubricant toward the spray assembly may include conveying the pressurized lubricant through a coupling member. The coupling member may include a first sealing member having an axially facing sealing portion and a second sealing member having a radially outwardly facing sealing portion. Heating the pressurized lubricant in the lubricant conduit may include heating the pressurized lubricant after the lubricant is conveyed through the coupling member.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting.

DETAILED DESCRIPTION

Figure 1:
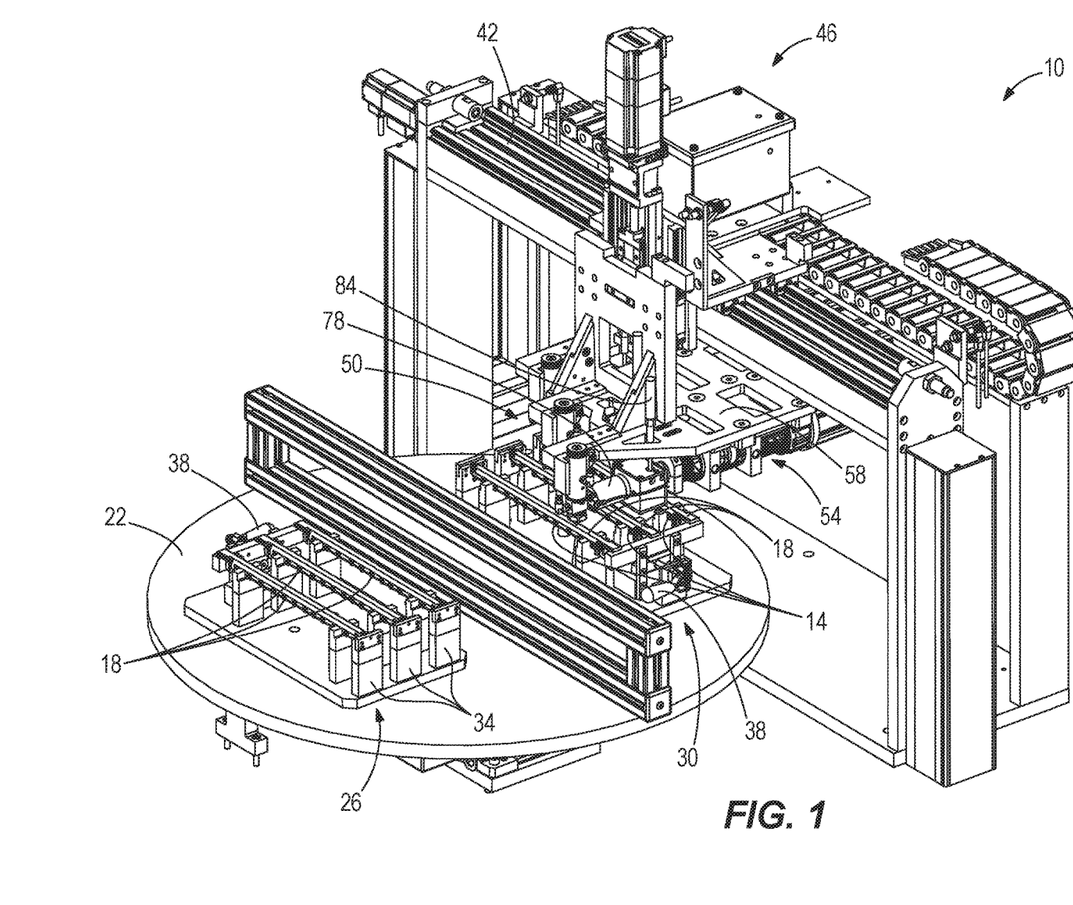
FIG. 1 is a perspective view of an automated lubrication applicator according to one embodiment.

FIG. 1 illustrates a system 10 for applying a lubricant to a surface. More particularly, the system 10 is configured for applying high temperature lubricant to a heating surface 14 of a fuser member 18, such as those found in certain types of image forming apparatus. The exemplary illustrated system 10 includes a rotary turntable 22 including a first set of fixtures 26 and a second set of fixtures 30 positioned opposite the first set of fixtures 26. The turntable 22 improves cycle time for the system 10 by allowing an operator to transfer fuser members 18 from the first set of fixtures 26 while the system applies lubricant to fuser members 18 secured to the second set of fixtures 30. Each set of fixtures includes a plurality of uprights 34 and a plurality of clamp members 38 for supporting and securing the fuser members 18 in the fixtures. In the illustrated configuration, when the fuser members 18 are secured in the fixtures 26, 30 the fuser members 18 are arranged substantially parallel to one another and the ends of each fuser member 18 are substantially aligned with the ends of the other fuser members 18.

A rail 42 is supported above the turntable 22 and has a carriage assembly 46 supported thereon for substantially linear movement therealong. The carriage assembly 46 is moveable along the rail 42 in a direction substantially parallel to the orientation of the fuser members 18 during application of lubrication. Movement of the carriage assembly 46 may be controlled using any suitable combination of motors, sensors, actuators, and controllers.

A spraying assembly 50 is fixedly coupled to the carriage assembly 46 for movement therewith. The illustrated spraying assembly 50 includes three lubrication assemblies 54, and each lubrication assembly 54 is configured to apply a predetermined amount of lubricant to the heating surface 14 of a respective one of the fuser members 18 as the carriage assembly 46 moves the spraying assembly 50 along the rail. The illustrated spraying assembly 50 includes a support plate 58 fixedly coupled to the carriage assembly 46. The lubrication assemblies 54 are coupled to the support plate 58 and are arranged diagonally relative to the direction of movement of the carriage assembly 46. Although not shown, each lubrication assembly 54 is provided with a dedicated set of electrical and fluid connections that control operation of the lubrication assembly 54, as discussed further below.

Figure 2:
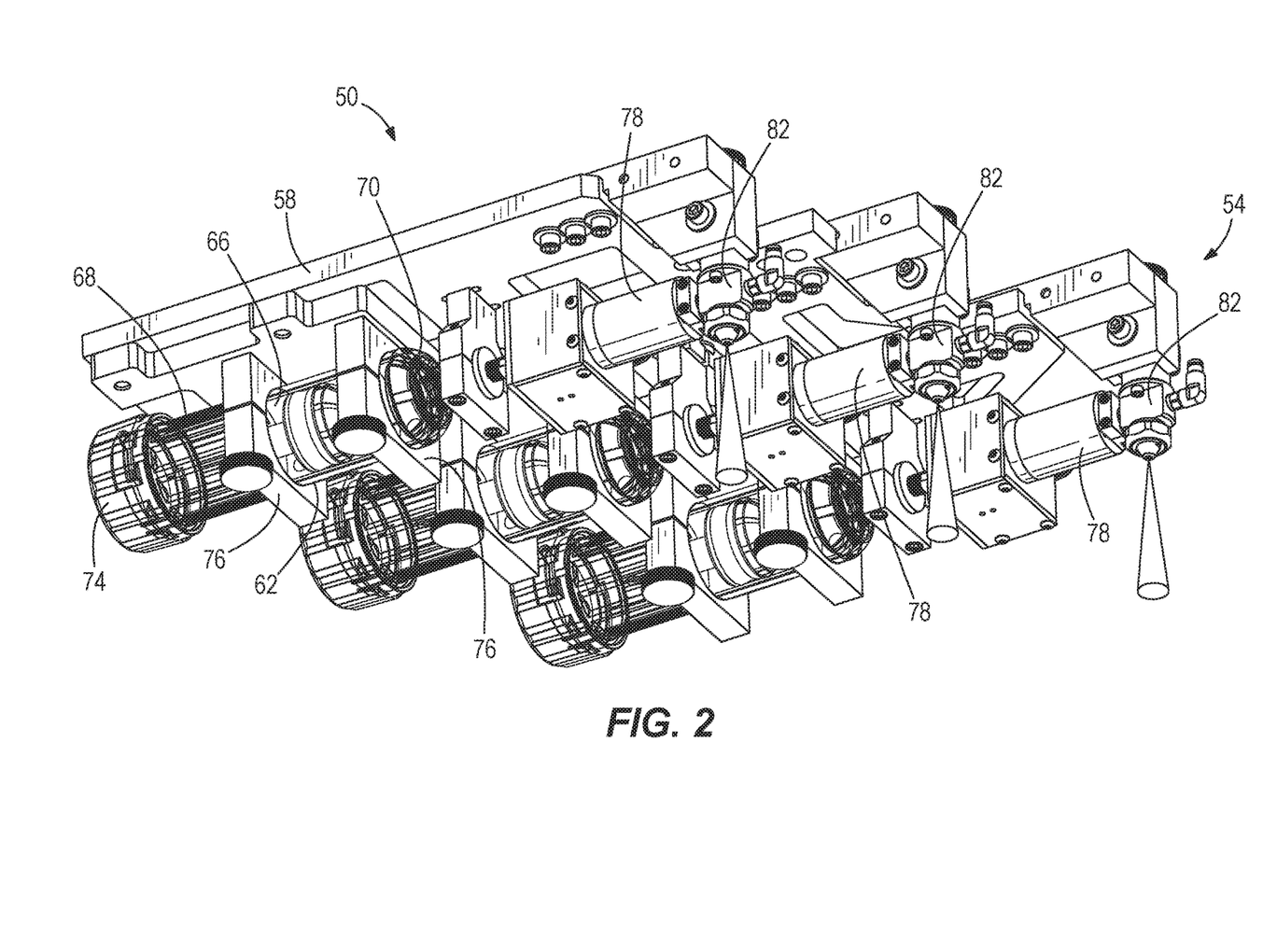
FIG. 2 is a perspective view of a spraying assembly of the lubrication applicator of FIG. 1.
Figure 3:
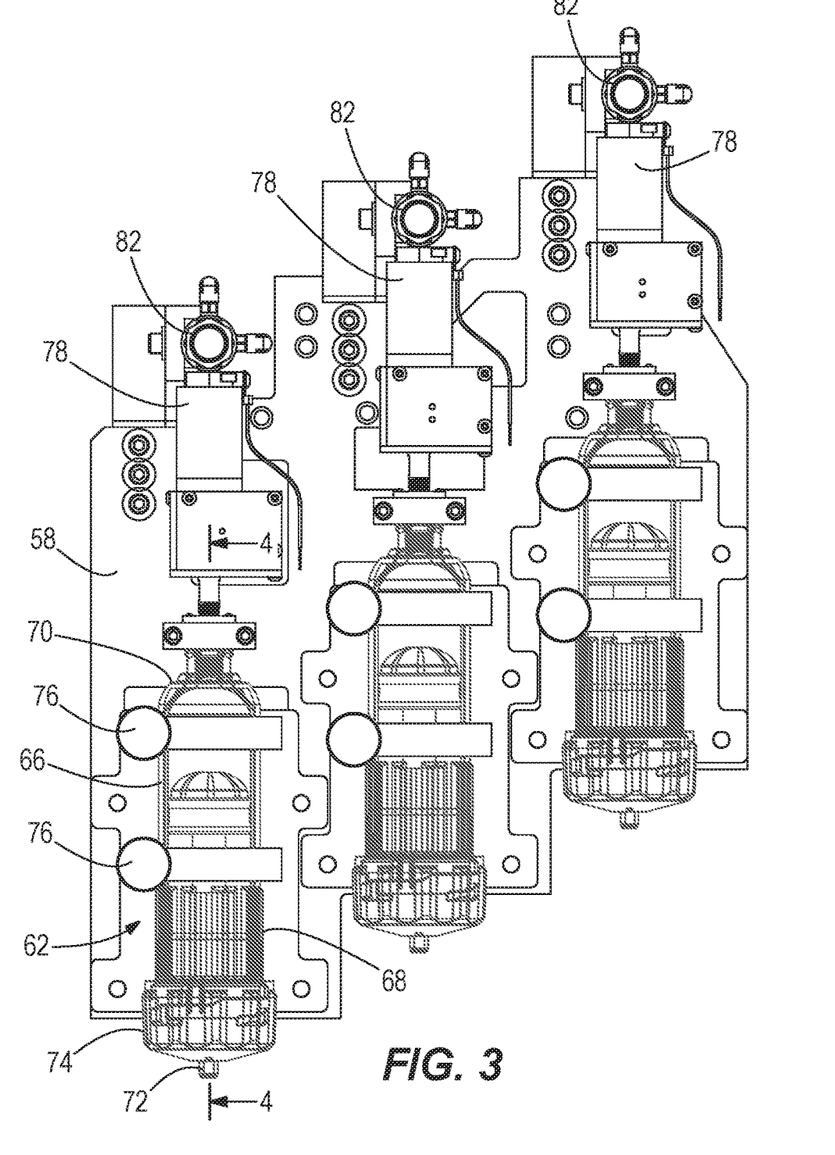
FIG. 3 is a bottom view of the spraying assembly of FIG. 2.

Referring also to FIGS. 2 and 3, each lubrication assembly includes a receiving chamber 62 for receiving a supply of lubricant. The receiving chamber 62 includes a body member 66 including an insertion end 68 configured to receive the supply of lubricant, and an output end 70. A cap member 74 is removably securable to the insertion end 68 of the body member 66, and is provided with a pneumatic coupling 72 for pressurization of the supply of lubricant, as discussed below. The body member 66 is coupled to the support plate 58 by clamps 76. A heating element 78 is positioned between the output end 70 of the receiving chamber 62 and a lubricant applicator, which in the illustrated embodiment comprises a nozzle assembly 82. In some embodiments, the nozzle assembly may be a commercially available spray valve, such as a 781 Series spray valve provided by Nordson EFD. Each heating element 78 is provided with an electrical conduit 84 for energizing the heating element 78 and, optionally, for monitoring a temperature of the heating element 78.

Figure 4:
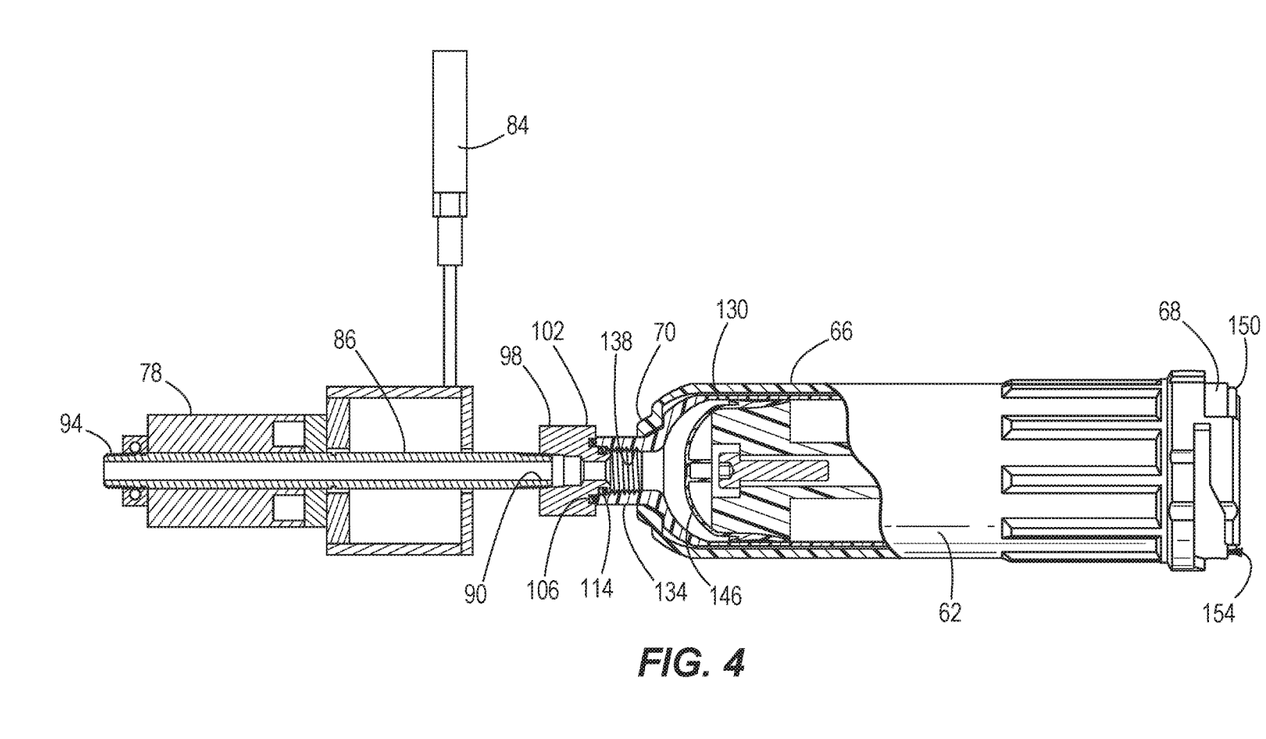
FIG. 4 is a section view taken along line 4-4 of FIG. 3.
Figure 6:
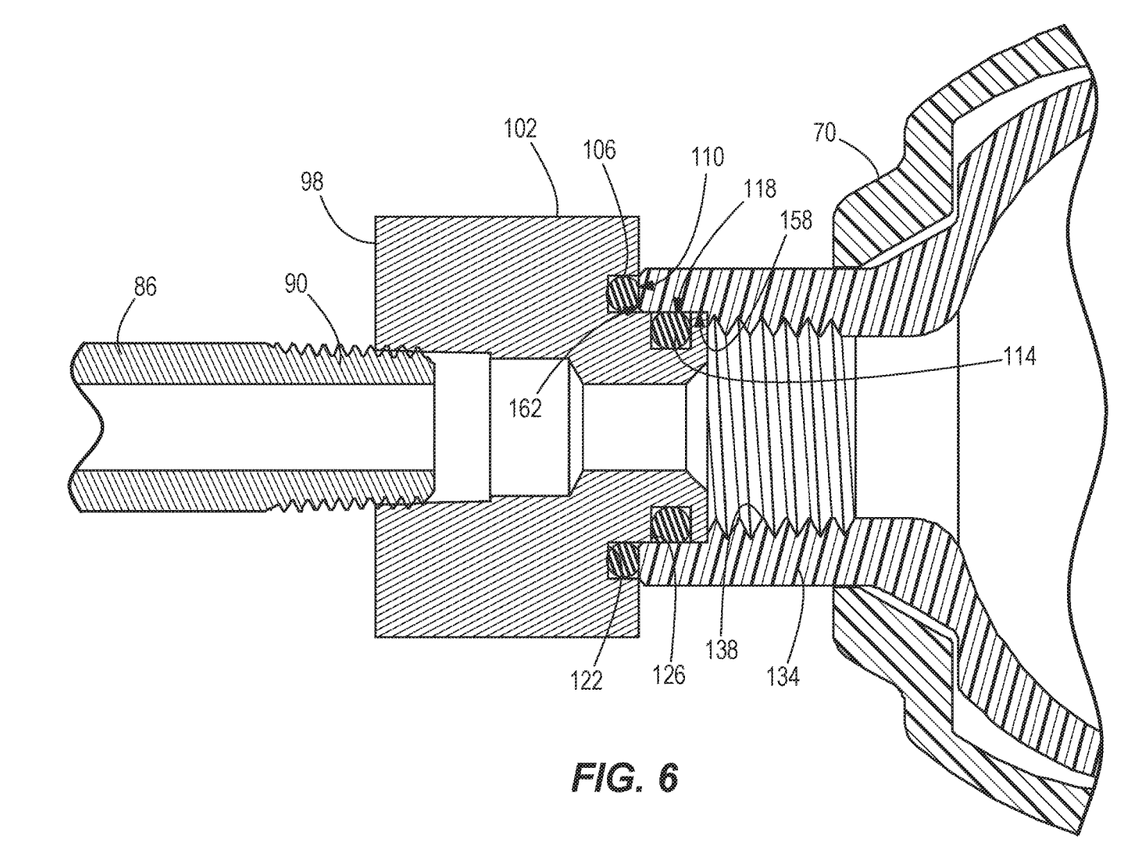
FIG. 6 is an enlarged section view similar to FIG. 4 showing an interface between a lubricant conduit and a discharge end of the lubricant tube of FIG. 5.
Figure 7:
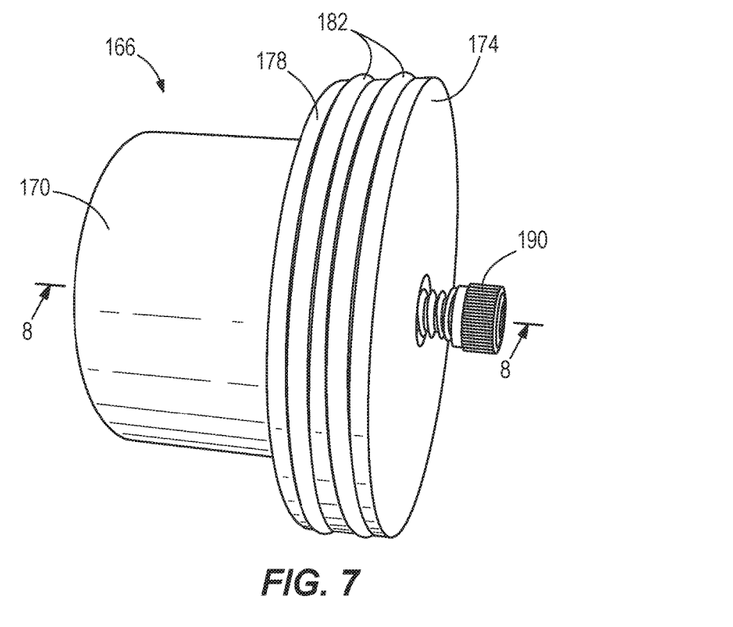
FIG. 7 is a perspective view of a seal pusher for the lubricant tube of FIG. 5.
Figure 8:
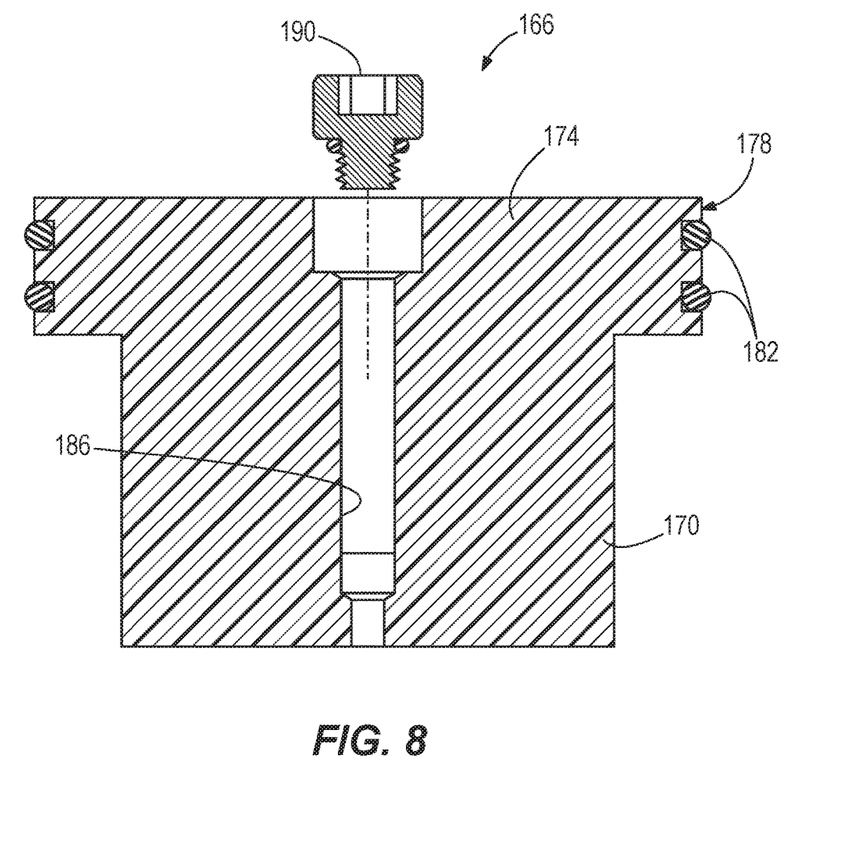
FIG. 8 is a section view taken along line 8-8 of FIG. 7.

Referring also to FIGS. 4 and 6, a lubricant conduit 86 extends through and is substantially surrounded by the heating element 78. The lubricant conduit 86 includes an input end 90 for receiving lubricant and an output end 94 that fluidly communicates with the nozzle assembly 82. As shown, the heating element 78 is positioned between the input end 90 and the output end 94. A coupling member 98 is provided on the input end 90 of the lubricant conduit 86 and includes a generally cylindrical sealing portion 102. The sealing portion 102 includes a first sealing member 106 having an axially facing sealing portion 110, and a second sealing member 114 having a radially outwardly facing sealing portion 118. In the illustrated construction the first and second sealing members 106, 114 are O-rings that are respectively situated in an axially opening circumferential groove 122 and a radially outwardly opening circumferential groove 126.

Figure 5:
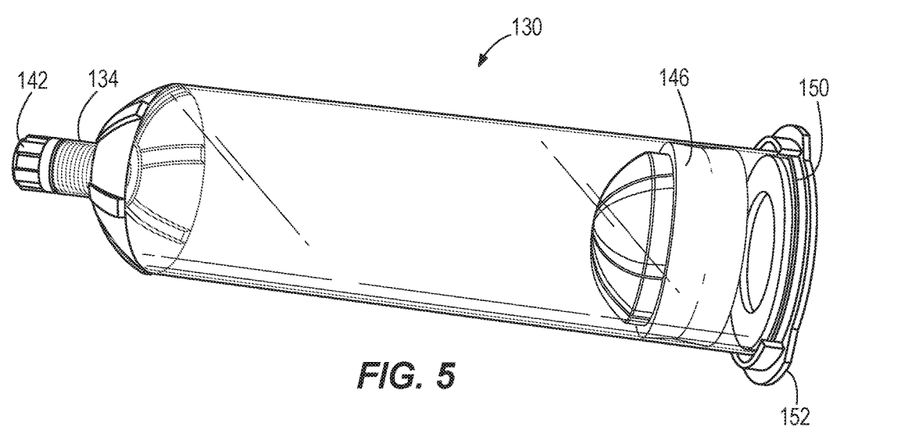
FIG. 5 is a perspective view of an empty lubricant tube as provided by a lubricant supplier.

Referring also to FIGS. 5 and 6, in the illustrated embodiment lubricant is supplied in a lubricant tube 130 that fits inside the receiving chamber 62. The lubricant tube 130 includes a reduced-diameter discharge end 134 including internal threads 138 for engagement with a closing cap 142.

The lubricant tube 130 also includes a plunger 146 for urging lubricant out of the discharge end 134. The lubricant tube 130 is generally cylindrical and includes a flange portion 150 opposite the discharge end 134. An end cap 152 may be secured to the flange portion 150 to retain the plunger 146 within the lubricant tube 130 until the lubricant tube 130 is ready for use.

The flange portion 150 is configured to mate against an end surface 154 of the insertion end 68 of the body member 66 of the receiving chamber 62. When the lubricant tube 130 is inserted into the receiving chamber 62 and the cap member 74 is secured to the insertion end 68, the cap member 74 presses the flange portion 150 against the end surface 154 to create a seal. In addition, securing the cap member 74 to the insertion end 68 with the lubricant tube 130 in place also urges the discharge end 134 of the lubricant tube 130 into sealing engagement with the coupling member 98. More specifically, the second sealing member 114 of the sealing portion 102 is urged into the discharge end 134 for sealing engagement with an inner cylindrical surface 158 of the discharge end 134. In addition, the first sealing member 106 of the sealing portion 102 is urged into sealing engagement with an annular end surface 162 of the discharge end 134. In this way, a dual-seal arrangement is provided between the discharge end 134 of the lubricant tube 130 and the coupling member 98.

Referring also to FIGS. 7-10, in some embodiments, the lubricant tube and the plunger 146 may be standard packaging provided by the supplier of the high temperature lubricant. In some embodiments, the receiving chamber 62 and the cap member 74 may also be provided by the supplier of the high temperature lubricant. In some applications, the seal between the lubricant tube 130 and the plunger 146 may be inadequate. Accordingly, the system may further include a seal pusher 166 configured to provide a more robust seal. The seal pusher 166 may be generally flange shaped, including a cylindrical portion 170 and a disk portion 174. The cylindrical portion is adapted to fit within a recess formed in the plunger 146. The disk portion 174 includes an outer cylindrical surface 178 that accommodates a pair of O-rings 182 that engage the inner surface of the lubricant tube 130. The pusher 166 is also provided with an axially extending and at least partially threaded through-opening 186 (FIG. 8) into which a bleeder screw 190 may be inserted. The through-opening 186 and bleeder screw 190 are used during installation of the pusher 166 to ensure direct mating contact between the pusher 166 and the plunger 146, as discussed further below.

The system 10 may be implemented to perform methods of applying a lubricant to a surface, such as the above-described exemplary embodiment configured to apply a high temperature lubricant to the heating surface 14 of a fuser member. By way of example, one such method is discussed below.

Figure 9:
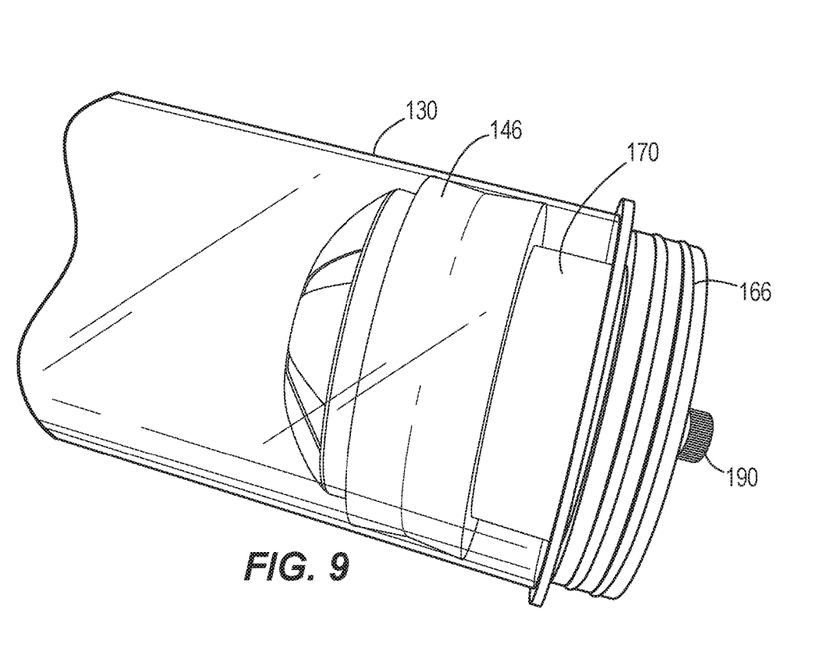
FIG. 9 is a perspective view showing the seal pusher of FIG. 7 partially inserted into the lubricant tube of FIG. 5.
Figure 10:
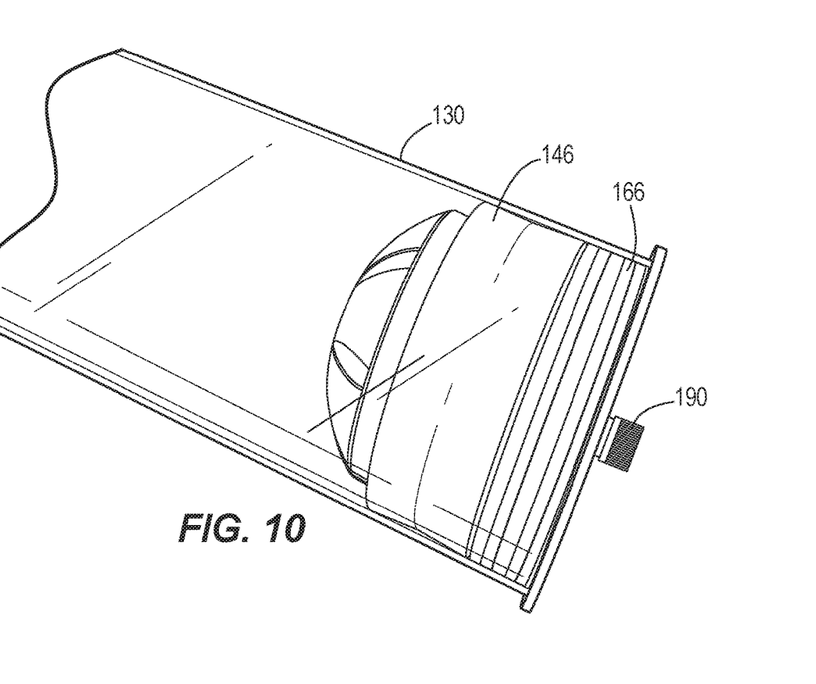
FIG. 10 is a perspective view similar to FIG. 9 showing the seal pusher of FIG. 7 fully inserted into the lubricant tube of FIG. 5.

Lubricant tubes 130 are provided or filled with a suitable lubricant and prepared for insertion into the receiving chamber by removing the end cap 152 to expose a rear surface of the plunger 146. The bleeder screw 190 on the seal pusher 166 is loosened to permit air flow through the through-opening 186. As shown in FIG. 9, the cylindrical portion 170 of the pusher 166 is inserted into the lubricant tube and fitted into a recess formed on the back side of the plunger 146. The outer cylindrical surface 178 of the pusher 166 is aligned with the inner surface of the lubricant tube 130 and pusher 166 is further inserted into the lubricant tube 130 until both O-rings are received within the lubricant tube 130 and the cylindrical portion 170 is fully seated against the plunger 146. As the pusher 166 is inserted, air trapped between the pusher 166 and the plunger 146 is allowed to escape via the through-opening 186. Once the pusher 166 is fully seated against the plunger 146, the bleeder screw 190 is tightened to seal off the through-opening 186, at which point the pusher 166 and the plunger 146 can operate together to urge lubricant through the discharge end 134 of the lubricant tube 130.

The closing cap 142 is removed from the discharge end 134 of the lubricant tube 130 and the cap member 74 is removed from the insertion end 68 of one of the receiving chamber body members 66. The discharge end 134 of the lubricant tube 130 is inserted into the insertion end 68 of the receiving chamber until the discharge end 134 makes sealing contact with the sealing portion 102 of the coupling member 98. The cap member 74 is then secured to the insertion end 68 and, when tightened, further urges the discharge end 134 into sealing engagement with the sealing portion 102 to improve the seal therebetween. The above procedure may then be repeated to insert a lubricant tube 130 into each receiving chamber 62.

A spraying cycle of the system 10 proceeds as follows. The system 10 may be programmed with specific operating parameters for a given size and type of fuser member 18 and for a given type of high temperature lubricant. Programming variables include the distance of movement of the carriage 46, the on/off timing for each of the nozzle assemblies 82, the pressure supplied to the nozzle assemblies, the pressure supplied to the pusher 166 by way of the pneumatic coupling 72 in the cap member 74, and the heat setting of the heating elements 78. In some embodiments, the system 10 may be provided with a plurality of pre-loaded programs stored in memory such that an operator can select the appropriate pre-loaded program based on the fuser member 18 and lubricant being used for the present operation.

Upon initiation of an operating cycle, actuators in the carriage assembly 46 operate to move the carriage assembly 46 along the rail 42. As each nozzle assembly 82 reaches the proximal end of its respective heating surface 14, the nozzle assembly 82 is activated to begin spraying lubricant onto the heating surface 14. Because the nozzle assemblies 82 are in a staggered, diagonal arrangement, while the ends of the fuser members are generally aligned, each nozzle assembly 82 starts spraying at a different time, which corresponds to the moment the nozzle assembly 82 arrives over the proximal end of its respective heating surface 14. The nozzle assembly 82 remains activated as the carriage assembly 46 moves along the rail 42 until the nozzle assembly arrives at the distal end of its respective heating surface 14, at which point the nozzle assembly is deactivated to stop spraying lubricant. The starting and stopping of the spraying operation may be controlled by, for example, electrically operated solenoid valves in communication with a central controller of the system 10. Movement of the carriage assembly 46 continues until the last nozzle assembly 82 reaches the end of its respective heating surface 14, at which point the carriage assembly 46 moves back along the rail 42 to its starting position.

During a spraying operation, pressure is applied by way of the pneumatic fitting 72 in the cap member 74 to urge lubricant through the coupling member 98 and along the lubricant conduit 86 toward the nozzle assembly 82. As the pressurized lubricant passes through the lubricant conduit 86, it is heated by the heating element 78. The heated, pressurized lubricant is then sprayed onto the heating surface by the nozzle assembly 82. Heating the lubricant reduces the viscosity of the lubricant to improve the uniformity of lubricant layer that is applied to the heating surface 14 of the fuser member 18. By heating the lubricant in the lubricant conduit 86 immediately before it is supplied to the nozzle assembly 82, the lubricant is maintained at an elevated temperature for a relatively short period of time, which results in less degradation of the lubricant when compared to other systems that require bulk quantities of lubricant to remain heated for extended periods. In addition, less energy is required when the lubricant is heated in the lubricant conduit 86 compared to bulk heating methods.

While the carriage assembly 46 is moving and the spraying operation is being performed on fuser members 18 secured by the second set of fixtures 30, an operator may be loading another set of fuser members 18 onto the first set of fixtures 26. When the spraying operation is complete, and when the operator has completed loading the fuser members onto the first set of fixtures, the rotary turntable 22 may operate to move the just-loaded fuser members 18 into position for spraying. The just-sprayed fuser members 18 may then be removed from the second set of fixtures 30 and unsprayed fuser members 18 may be loaded into the second set of fixtures 30 while the fuser members 18 on the first set of fixtures 26 are being sprayed. This process may continue for as long as the machine remains in operation.

While specific embodiments have been illustrated and described, numerous modifications come to mind without significantly departing from the spirit of the disclosure, and the scope of protection is to be commensurate with the scope of the accompanying claims.

What is claimed is:

1. A fuser lubricant applicator comprising:
   a base fixture including uprights and clamp members for supporting a plurality of fuser members in a spaced and substantially parallel relationship;
   a spraying assembly moveably supported above the base fixture for movement in a direction substantially parallel to the orientation of the plurality of fuser members, the spraying assembly including a plurality of lubrication assemblies, each lubrication assembly including:
   a receiving chamber for receiving lubricant;
   a nozzle positioned to apply lubricant to a respective one of the fuser members; and
   a heating element positioned between the receiving chamber and the nozzle.

2. The applicator of claim 1, wherein the lubrication assembly further includes a lubricant conduit having an input end proximal to the receiving chamber and an output end in communication with the nozzle, and wherein the heating element substantially surrounds the lubricant conduit.

3. The system of claim 1, wherein the receiving chamber includes an insertion end configured to receive a supply of the lubricant and an output end opposite the insertion end.

4. The system of claim 3, further comprising a pusher member positionable within the supply of the lubricant for applying pressure to the lubricant, the pusher member including a pressure face facing away from the lubricant and toward the insertion end when the supply of lubricant is received by the receiving chamber.

5. The system of claim 4, wherein the pusher member includes a through opening and a pressure release member associated with the through opening and moveable between a sealed position and an unsealed position for venting the through opening.

6. The system of claim 1, wherein the lubrication assembly further includes a lubricant conduit having an input end proximal to the receiving chamber and an output end in communication with the nozzle, and wherein the input end includes a coupling member having a generally cylindrical sealing portion, the sealing portion including a first sealing member having an axially facing sealing portion and a second sealing member having a radially outwardly facing sealing portion.

7. The system of claim 6, wherein the coupling member defines an axially opening circumferential groove that receives the first sealing member and a radially outwardly opening circumferential groove that receives the second sealing member.

* * * * *